United States Patent
Kloth et al.

(10) Patent No.: US 7,324,524 B2
(45) Date of Patent: Jan. 29, 2008

(54) PSEUDO SYNCHRONOUS MACHINE

(75) Inventors: Axel K. Kloth, Mountain View, CA (US); Paul Bergantino, Lexington, MA (US); Moshe De-Leon, Kiron (IL); Daniel Fu, Saratoga, CA (US); Stephen M. Mills, Sharon, MA (US); Jeremy Bicknell, Carlsbad, CA (US); Warner Andrews, Boulder, CO (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 1002 days.

(21) Appl. No.: 10/284,494

(22) Filed: Oct. 29, 2002

(65) Prior Publication Data

US 2004/0081169 A1    Apr. 29, 2004

(51) Int. Cl.
*H04L 12/56* (2006.01)
*H04L 12/44* (2006.01)

(52) U.S. Cl. .................................. 370/395.51; 370/907
(58) Field of Classification Search ........... 370/395.51, 370/395.7, 446, 447, 907
See application file for complete search history.

(56) References Cited

U.S. PATENT DOCUMENTS

| | | | |
|---|---|---|---|
| 5,081,575 A | | 1/1992 | Hiller et al. |
| 5,500,858 A | | 3/1996 | McKeown |
| 5,541,926 A | * | 7/1996 | Saito et al. .................. 370/474 |
| 5,771,231 A | * | 6/1998 | Watanabe .................... 370/377 |
| 5,838,677 A | * | 11/1998 | Kozaki et al. ............... 370/389 |
| 6,046,982 A | * | 4/2000 | Ozveren et al. ............ 370/232 |
| 6,072,772 A | | 6/2000 | Charny et al. |
| 6,075,788 A | * | 6/2000 | Vogel ..................... 370/395.51 |
| 6,195,335 B1 | | 2/2001 | Calvignac et al. |
| 6,208,667 B1 | | 3/2001 | Caldara et al. |
| 6,249,524 B1 | * | 6/2001 | Moriwaki et al. ........... 370/412 |
| 6,510,163 B1 | * | 1/2003 | Won ........................... 370/466 |
| 6,711,167 B1 | * | 3/2004 | Ikeda et al. ............... 370/395.1 |
| 6,862,295 B1 | * | 3/2005 | Stacey et al. ............... 370/466 |
| 6,982,991 B1 | * | 1/2006 | Atoji ........................... 370/474 |
| 7,106,746 B1 | * | 9/2006 | Dorbolo ................. 370/395.51 |

OTHER PUBLICATIONS

"R&D 100 Awards 1999: The Optical Modulator and Switch: Light on the Move", Ann Parker, Lawrence Livermore National Laboratory, 1999 pp. 4-5.

"iSKIP: A Fair and Efficient Scheduling Algorithm for Input-Queued Crossbar Switches", Walter Wang, Libin Dong and Wayne Wolf, (Publication Unknown) (date unknown).

(Continued)

*Primary Examiner*—Chau Nguyen
*Assistant Examiner*—Marcus R Smith
(74) *Attorney, Agent, or Firm*—Weide & Miller, Ltd.

(57) ABSTRACT

A method and apparatus is disclosed for interfacing an asynchronous network with a synchronous network and in particular for efficiently utilizing available bandwidth of a synchronous network transmit opportunity. In one embodiment asynchronous traffic arrives via an asynchronous network at a network device, such as a switch, for transmission over a synchronous network. The traffic is parsed into cells and after switching, a reassembly unit is provided for processing one or more cells buckets. Write operations occur based on an ingress pointer while read operations are controlled by an egress pointer. Upon occurrence of a transmit opportunity on the synchronous network, the entire bandwidth of the transmit opportunity is utilized by loading awaiting cells from bucket memory on to the synchronous network. Sufficient cells are stored in memory between the memory locations identified by the ingress pointer and the egress pointer to insure total utilization of transmit opportunity bandwidth.

4 Claims, 10 Drawing Sheets

OTHER PUBLICATIONS

"Evolution of Switch Architectures: Design Considerations: A Personal View", Santosh Krishnan, Bell Laboratories, Lucent Technologies, Jan. 27, 2000, pp. 1-24.

"The Tiny Tera Scheduler: The Algorithm and Its Implementation", Pankaj Gupta, Briefing to Cisco Systems, Mar. 17, 1997, pp. 1-7.

"Achieving 100% Throughput in an Input-Queued Switch", Nick McKeown, Adisak Mekkittikul, Venkat Anantharam, and Jean Walrand, IEEE, Transactions on Communications, vol. 47, No. 8, Aug. 1999, pp. 1260-1267.

"The iSLIP Scheduling Algorithm for Input-Queued Switches", Nick McKeown, IEEE/ACM Transactions of Networking, vol. 7, No. 2, Apr. 1999, pp. 188-201.

"Design and Evaluation of a Parallel-Polled Virtual Output Queued Switch", K.J. Christensen, Department of Computer Science and Engineering, University of South Florida, (Material is based upon work supported by the National Science Foundation under Grant No. 987517) (Unknown Date), pp. 1-5.

"LCAS (Link Capacity Adjustment Scheme for Virtual Concatenation) Tutorial" (TIX1.5/2002-044), Steve Gorshe, PMC - Sierra, Jan. 2002, pp. 1-16.

"Introduction to SONET Virtual Concatenation" (TIX1.5/2002-045), Nevin R. Jones, TIX1 Kaui HI, Jan. 2002 Meeting, pp. 1-17.

"The iSLIP Scheduling Algorithm for Input-Queued Switches", Nick McKeowan, (Unknown Publication) (Unknown Date), pp. 1-36.

"New Techniques Re-Time Data Signals for Plesiochronous Communication", Brian Wong, Plant Analog.com, Feb. 15, 2002, pp. 1-11.

"White Paper: A Fast Switched Backplane for a Gigabit Switched Router", Nick McKeown, Business Communications Review (Unknown Date), pp. 1-17.

"ATM Tutorial—A Little Bit of History . . . Or Why Do We Need ATM?", http://www.rad.com/networks/1994/atm/tutorial.htm (1994) pp. 1-10.

"The 4 by 4 Switch Fabric", http://www.cl.cam.ac.uk/Research/SRG/bluebook/29/fab4+8/node1.html (Unknown Date), pp. 1-4.

"Clock and Data Recovery Products", Vectron International, http://www.vectron.com/products/cdr/appnote1.htm, (Unknown Date), pp. 1-8.

"Tutorial—Designing for High Performance With PSI", Circuit Cellar Online, http://www.chipcenter.com/circuitcellar/november01/c1101mm7.htm, pp. 1-2.

"Application of Programmable Multithreaded Network Processor Architecture to OC-192 Packet Forwarding", Paul Alexander, Principal System Architect, Lexra Corporation, 2001, pp. 1-7.

"Product Brief: Decathlon 10 Gigabit Ethernet UniPHY", Chip Center, The Web's First Definitive Electronics Resource, http://www.chipcenter.com/networking/products, 1999, pp. 1-4.

\* cited by examiner

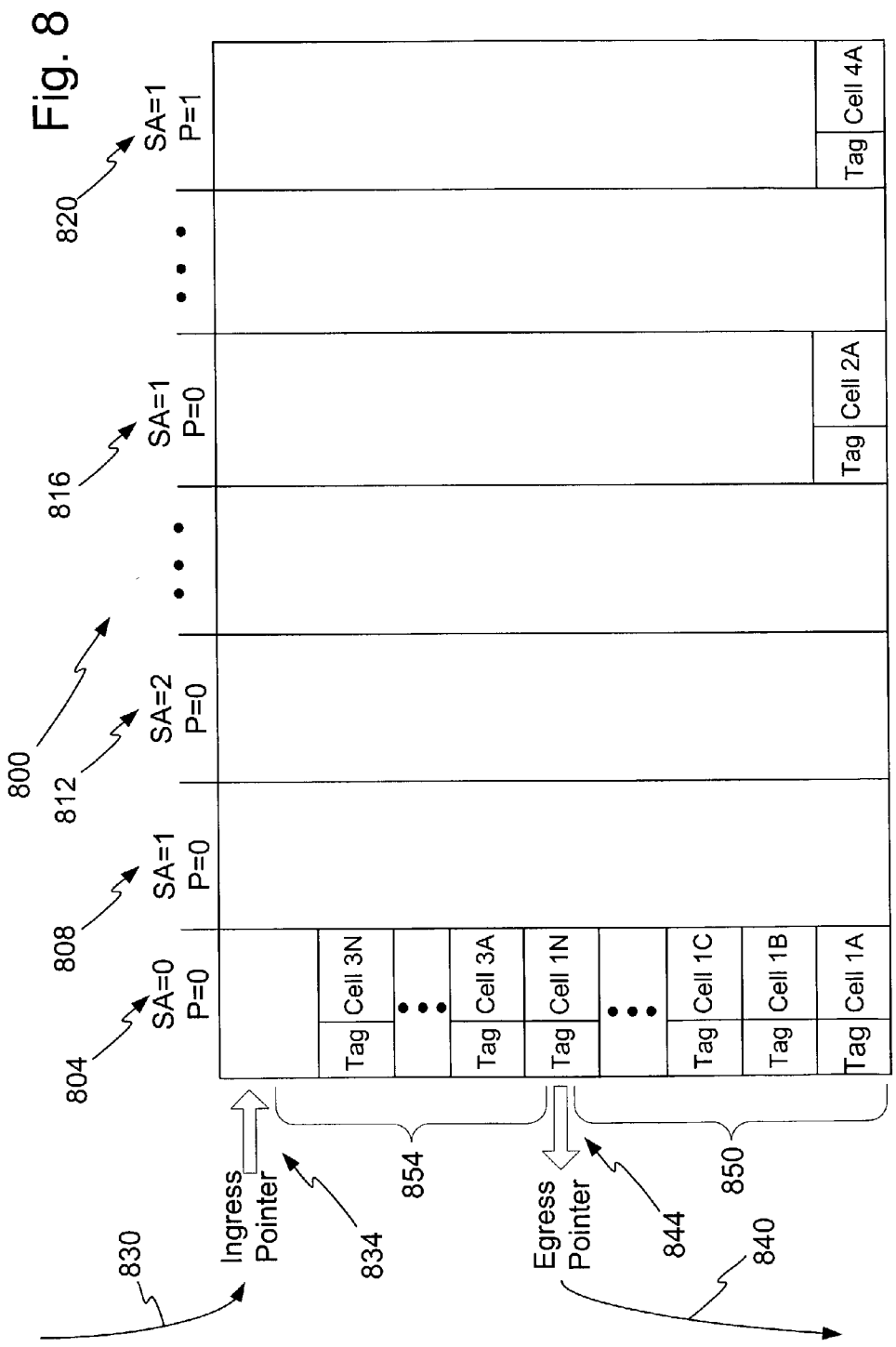

PSEUDO SYNCHRONOUS MACHINE

FIELD OF THE INVENTION

The invention relates to data switching and in particular to a method and apparatus for data exchange between a synchronous network or system and an asynchronous network or system.

RELATED ART

Transfer of data via computerized networks has become a common and relied upon way to exchange data and communication. Numerous methods or protocols exist to guide transfer of data between locations over the computerized networks. In recent years, different types of network protocols have been developed to meet the particular demands of the network and its users. A network protocol provides a set of rules for controlling or guiding network operation. In some networks, data transmission occurs asynchronously, while in other networks data transmission occurs synchronously.

One example of a synchronous data network is a network operating under the SONET or SDH protocol. A SDH/SONET network, or synchronous optical network, is a network configured to exchange data over an optical fiber in a synchronous manner based on dividing the bandwidth into available transmit periods.

Transmitting data in a synchronous manner provides advantages over asynchronous data transmission. One such advantage is that the quality of service to a network user, such as a customer of the network operator, may be guaranteed. Quality of service (QoS) may be defined generally as the level of service that is provided or guaranteed to a customer or user of a network. For example, QoS may relate to an aspect of network operation such as minimum bandwidth, a maximum limit on latency, cell delay, cell delay variation or the availability of the communication channel. By maintaining QoS factors for a user, network content may include time sensitive data, such as real time voice or video information. QoS on a synchronous network may more easily be established because, in contrast to an asynchronous network, a synchronous (or plesiochronous) network has a known and fixed bandwidth for a particular user. In the exemplary SDH/SONET network the bandwidth is divided into transmit opportunities. Each transmit opportunity is capable of sending a fixed number of frames or cells through the network. By way of example, each SDH/SONET frame consists of 810 bytes and a frame is transmitted every 125 microseconds, i.e. 8000 frames per second. This equates to 51.84 Mbps. Because the transmit opportunities occur at regular and known intervals QoS predictions can be made. For example, a customer may be entitled to transmit data in 800 of the 8000 frames that are transmitted per second. Hence, this customer is entitled to a guaranteed 10% of the bandwidth or 5.184 Mbps of bandwidth.

In contrast to synchronous networks, asynchronous networks transmit data in a burst fashion such that different devices transmit data over the network at irregular intervals when the network is available. In some embodiments the data is proceeded and followed by start or stop bits to thereby signify the beginning of transmission and the end of transmission. Hence the data transmit opportunities are not based on a time or clock signal but on network availability. While asynchronous networks are often less expensive and less complex than their synchronous counterparts, they suffer from the drawback of congestion and a limited ability to guarantee QoS.

FIG. 1 illustrates a block diagram of an example embodiment of a synchronous network interfaced with an asynchronous network. As shown, the synchronous network 100 comprises a plurality of add/drop multiplexers (ADM) 104-120 connected by a channel 124. Interfacing with the ADM 104 is a router or other network processing device 130. The router 130 is linked to one or more asynchronous networks such as a first network 134 and a second network 138 or receives network traffic directly via one or more asynchronous traffic ports 142. The router 130 serves as an intermediary between the ADM 104 and the asynchronous networks 134, 138, and asynchronous traffic on ports 142.

As can be understood, one drawback to the prior art is that reliable and efficient submission of asynchronous traffic into a synchronous network presents many problems. To fully utilize the bandwidth of the synchronous network, it is desirable to fill each container, i.e. frame or cell available during a transmit opportunity. Failure to fill each container results in a reduced overall bandwidth and is wasteful of channel capacity.

In addition, the configuration of FIG. 1 requires both the ADM 104 and the router 130 to achieve interface between asynchronous network traffic 142 and the synchronous network 100. Duplicate devices increase the cost, space, power consumption and cooling capacity required to maintain the network and the interface. This is a significant drawback that inhibits connection to a synchronous network 100.

As a result of the drawbacks of the prior art, there exists a need for an efficient and reliable method and apparatus to provide asynchronous traffic to and from a synchronous network.

SUMMARY

As an advantage of the method and apparatus described herein, many of the problems associated with asynchronous networks may be overcome by establishing or enabling packet networks or asynchronous network to operate or carry time division multiplexed data. Thus, some of the benefits of synchronous networks may be enjoyed with packet based networks. In one embodiment packet traffic may be directed to a SDH/SONET network in a known manner and with known data rates. In such an embodiment the packet based network behaves, from a timing standpoint, similarly to a synchronous network. The principles disclosed herein may be applied to embodiments or applications other than those described herein.

In one embodiment a method is provided for routing asynchronous traffic to a synchronous network comprising the steps of receiving a cell from an asynchronous network. The cell may have a header and a payload. The method then analyzes the header to classify the cell and stores the cell at the memory location defined by an ingress pointer based on the analyzing to create stored cells and then updates the ingress pointer. Thereafter, responsive to a transmit opportunity in the synchronous network the method reads the stored cells from the memory at a location defined by an egress pointer and transmits the stored cells onto the synchronous network. Thereafter, the method updates the egress pointer. The ingress pointer and the egress pointer are maintained such that during a transmit opportunity stored cells are transmitted onto the synchronous network.

It is further contemplated that receiving a cell may comprise receiving frames via an asynchronous network and segmenting the frames into one or more cells. Thereafter, the method further associates a header with each of the one or more cells and switches the one or more cells and associated header through a switch fabric. It is contemplated that a transmit opportunity comprises an opportunity to allow a first number of cells to be transmitted onto the synchronous network and the switching occurs at a rate which allows the first number of cells to be memory. For example, the first number of cells may comprise a container of cells. In this exemplary method of operation, the ingress pointer and the egress pointer are maintained such that during a transmit opportunity no less than a container of cells remains in the memory.

In another method of operation, interface of an asynchronous network with a synchronous network comprising receiving a cell from an asynchronous network and storing the cell at a first memory location defined by a first pointer value. Thereafter, the method may process the cell through a switch during a switching event and storing the cell in a second memory. The method of operation then detects a transmit opportunity in a synchronous network and transmits the two or more cells from the second memory onto the synchronous network during the transmit opportunity.

In one embodiment the step of transmitting comprises transmitting a container of cells onto the synchronous network during every transmit opportunity. The container comprises an amount of cells which may be transmitted during a transmit opportunity. It is contemplated that processing the cell may comprise maintaining a container of cells in the second memory. In one embodiment the processing occurs at a rate sufficient to maintain transmitting of the two or more cells from the second memory during every transmit opportunity. The processes of receiving a cell from an asynchronous network may comprise an unscheduled occurrence and the transmit opportunity may comprise a scheduled occurrence.

It is also possible to divide the second memory into one or more queues and, as such, storing the cells in the second memory comprises storing the cells into the one or more queues. Similarly, the step of transmitting may occur from the one or more queues based on a priority of the one or more queues. The switch may comprise a crossbar switch.

Also disclosed herein is a system for maximizing bandwidth usage during a transmit opportunity in a synchronous network to thereby transmit asynchronously arriving data onto the synchronous network. One embodiment of this system comprises a memory having two or more memory locations configured to store one or more cells and a memory write module configured to store cells in the memory at a location defined by an ingress pointer value. A memory controller is also part of this system and is configured to determine the ingress pointer value and an egress pointer value. In communication with the memory is a memory read module configured to, upon occurrence of a transmit opportunity, read a one or more cells from a memory location defined by the egress pointer value. A transmit module is part of the system and is configured to transmit the one or more cells onto the synchronous network during the transmit opportunity.

In one embodiment of this system, during each transmit opportunity sufficient cells are stored in the memory to fully utilize the bandwidth of the transmit opportunity. Further, the cells may be provided to the memory after processing through a switch at a rate sufficient to maintain enough cells in memory to fully utilize the bandwidth available during a transmit opportunity. It is contemplated that the two or more memory locations may comprise queues identified by a priority and a port. The synchronous network may comprise a SONET network and the number of cells to fully utilized the bandwidth available during a transmit opportunity comprises a container of cells.

In another embodiment, a system is disclosed for providing asynchronous network traffic to a synchronous network. This embodiment comprises a memory having one or more memory locations and a switch configured to route asynchronously arriving data to the memory via one or more ports of the switch. Also in communication with the memory is a synchronous network interface configured to perform numerous tasks. The synchronous network interface generates a first pointer value and a second pointer value. The first pointer value is configured to define a memory location at which data is stored in the memory while the second pointer value is configured to define a memory location at which data is read from the memory. The synchronous network interface also outputs data for transmission over a synchronous network during a synchronous network transmit opportunity.

In one embodiment the data comprises a number of cells sufficient to fill the bandwidth available during a transmit opportunity. The data stored in the memory between memory locations defined by the first pointer value and the second pointer value may be of sufficient size to fill the bandwidth of a transmit opportunity. In one embodiment the switch operates using of a scheduling algorithm utilizing round robin arbitration and least recently used arbitration.

With regard to the switch and the switch scheduling algorithm, the algorithm may be configured to control switch connections in a crossbar switch with two or more input ports and two or more output ports. In this embodiment the method involves generating two or more request signals for access to an output port and providing these signals to two or more grant arbiters. Thereafter, selecting between the two or more request signals at each grant arbiter is based on round robin scheduling. The selecting between the two or more request signals generates a grant signal. Next, the method provides a grant signal from the two or more grant arbiters to each accept arbiter and selects between grant signals at each accept arbiter based on least recently used scheduling. In one embodiment the selecting between grant signals generates an accepted grant signal. The accepted grant signal is provided to a switch such that the accepted grant signal controls switch connections.

The switch may have two or more input ports configured to receive data and two or more output ports configured to transmit data. Internal to the switch is a crossbar matrix configured to selectively connect an input port to an output port based on control signals. A scheduler is configured to generate the control signals to thereby determine which input port connects to which output port during a switching event of the crossbar matrix.

In one embodiment the scheduler comprises two or more queues configured to store data directed to one or more of the two or more output ports. A queue is configured to generate a request signal when data is stored in the queue. The queue may also include a grant arbiter configured to receive a request signal and select a request signal from two or more requests and output a grant signal indicative of the selected request signal. An accept arbiter is configured to receive two or more grant signals and generate a selected grant signal designating an output port based on least recently used arbitration.

In one embodiment the synchronous network interface connects to a synchronous network to thereby provide asynchronous network traffic to a synchronous network. It is contemplated that the first pointer value comprises an ingress pointer and the second pointer value comprises an egress pointer.

Also disclosed herein is a segmentation and reassembly device comprising an input configured to receive data. It is contemplated that the data may have passed through a switch and been routed by the switch to the segmentation and reassembly device. One aspect of the segmentation and reassembly device comprises a cell assembly unit configured to regenerate the data into cells and a memory configured to store the cells. In communication with the memory is a memory controller configured to perform functions such as analyze the cells, maintain one or more queues in the memory, and responsive to the analysis, store and retrieve the one or more cells in the memory. A synchronous network interface is part of the segmentation and reassembly device and is configured to retrieve the cells from the memory during a transmit opportunity in a synchronous network.

It is contemplated that the synchronous network interface may comprise an output flow control unit. In addition, the one or more queues may be identified based at least on a transmit priority designation. The input may receive data routed through a switch and the data may arrive at the switch from an asynchronous network. The cell assembly unit may further comprise a tag generation module configured to generate a tag for association with a cell.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 8 illustrates a memory having an ingress memory pointer and an egress memory pointer.

DETAILED DESCRIPTION

Figure 1:
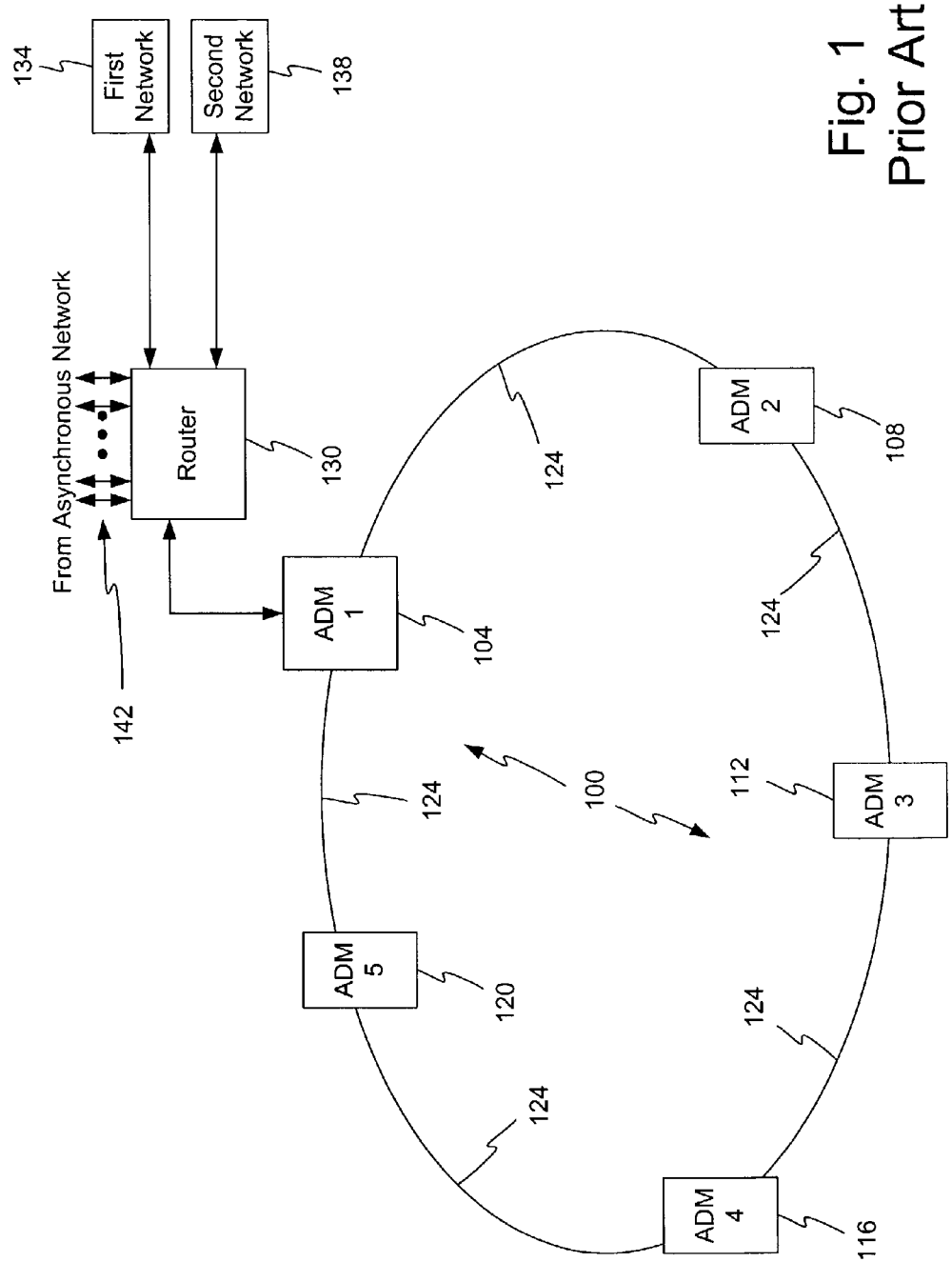
FIG. 1 is a block diagram illustrating an example embodiment of a synchronous network and one or more asynchronous networks.
Figure 2:
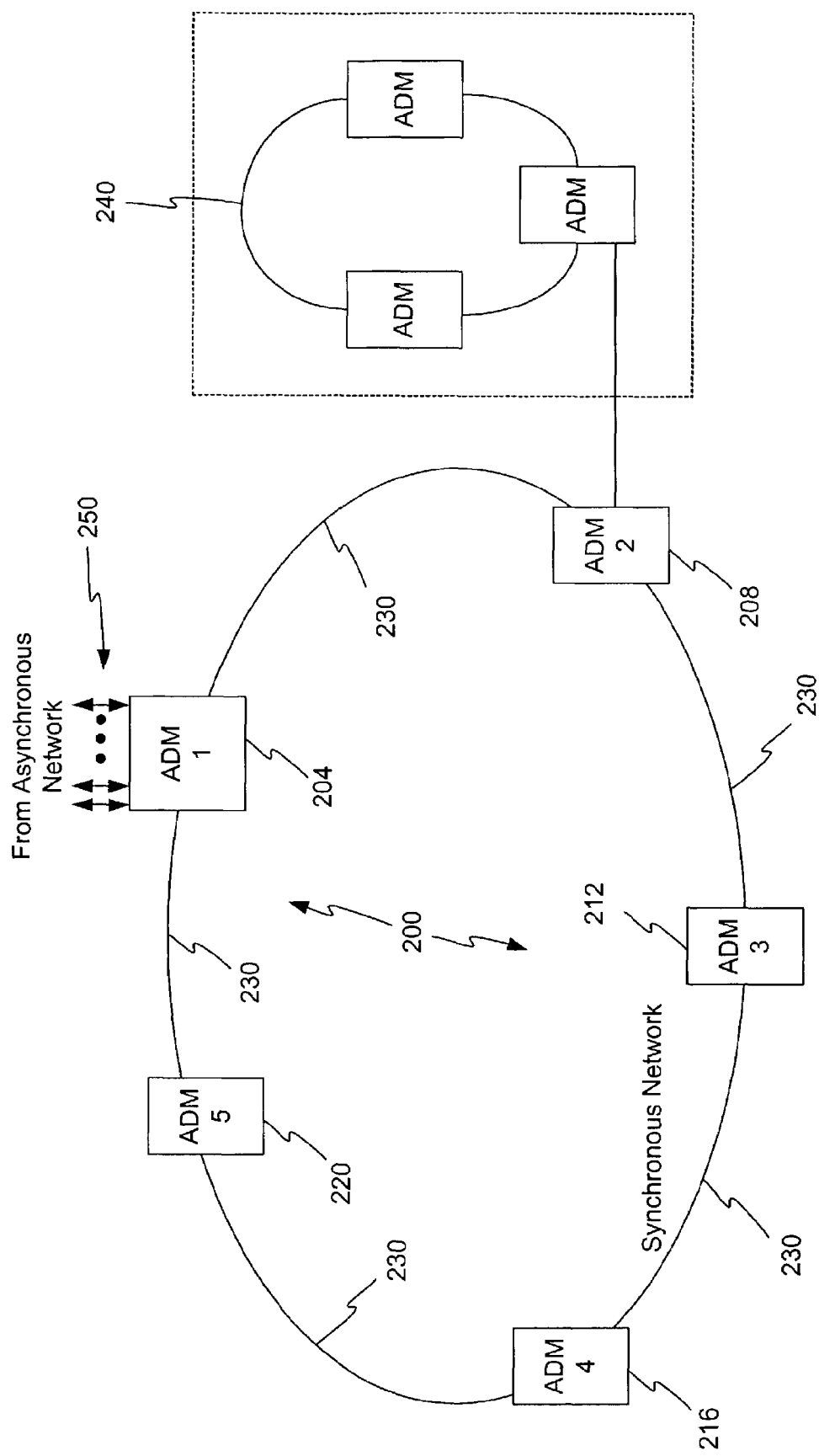
FIG. 2 illustrates an example environment of an example embodiment of the invention.

FIG. 2 illustrates an example environment of an example embodiment of the invention. As shown in FIG. 2, components of a synchronous network interface directly with asynchronous network traffic. A synchronous network 200 includes add/drop multiplexers (ADM) 204, 208, 212, 216, 220 connected by one or more channels 230. The ADMs may also be referred to as switching interfaces. The add/drop multiplexers (ADM) comprise devices configured to receive data from the network and transmit data onto the network. In addition, the ADM may aggregate or split network traffic based on bandwidth allowances or other factors. Basic configurations and operation of prior art ADMs are know by those of ordinary skill in the art and accordingly ADM operation is not described in detail herein beyond that associated with the new and unique aspects of the invention. The configuration and operation of the ADM is described below in detail.

The channel 230 may comprise any type channel capable of carrying high speed data communication such as but not limited to fiber optic cable, twisted pair, coaxial, radio or microwave signals, free space optics, and the like.

In the embodiment shown in FIG. 2 one or more ADMs, such as ADM 208, may connect to an additional synchronous network 240 to thereby exchange data with more devices or over a greater physical area. It is further contemplated that, as a result of the methods and apparatus described herein, that one or more of the ADMs, such as ADM 204 may be in direct interface with asynchronous network traffic 250. This provides the advantage of interfacing asynchronous network traffic with a synchronous network. This reduces the amount of equipment necessary to interface these types of networks and provide an ability to provide quality of service assurances to the asynchronous network. Other advantages are described below.

Figure 3:
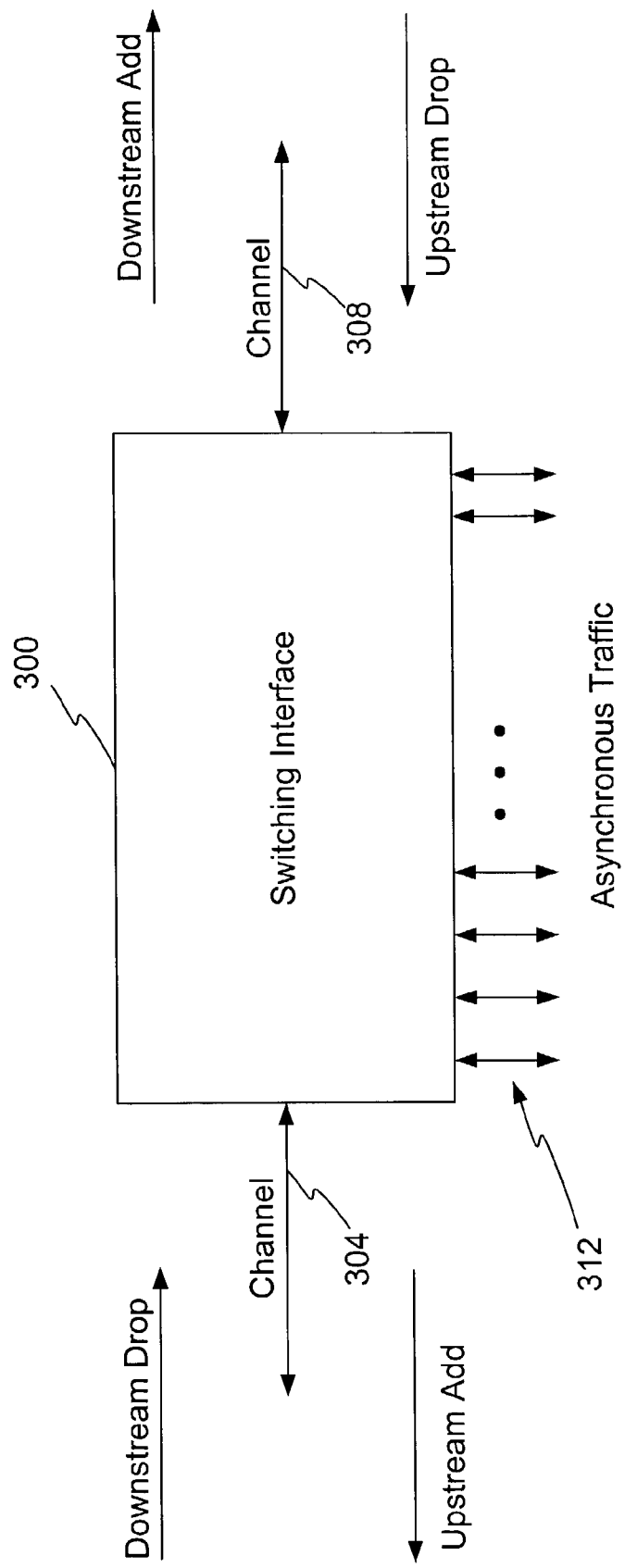
FIG. 3 illustrates a block diagram of an example embodiment of a switching interface in a synchronous network.

FIG. 3 illustrates a block diagram of an example embodiment of a switching interface in a synchronous network. In one embodiment the switching interface 300 is configured as an ADM. The switching interface 300 comprises a connection to a first channel 304 and a connection to a second channel 308. The first channel 304 and the second channel 308 may comprise any type channel capable of carrying high-speed data. The channels 304, 308 may comprise a plurality of channels. The first channel 304 may be thought of as carrying upstream traffic in one direction, such as from right to left, and downstream traffic in another direction, such as from left to right. One or more ports 312, connectors, or conductors provide input and output to the switching interface 300 for asynchronous traffic.

Figure 4:
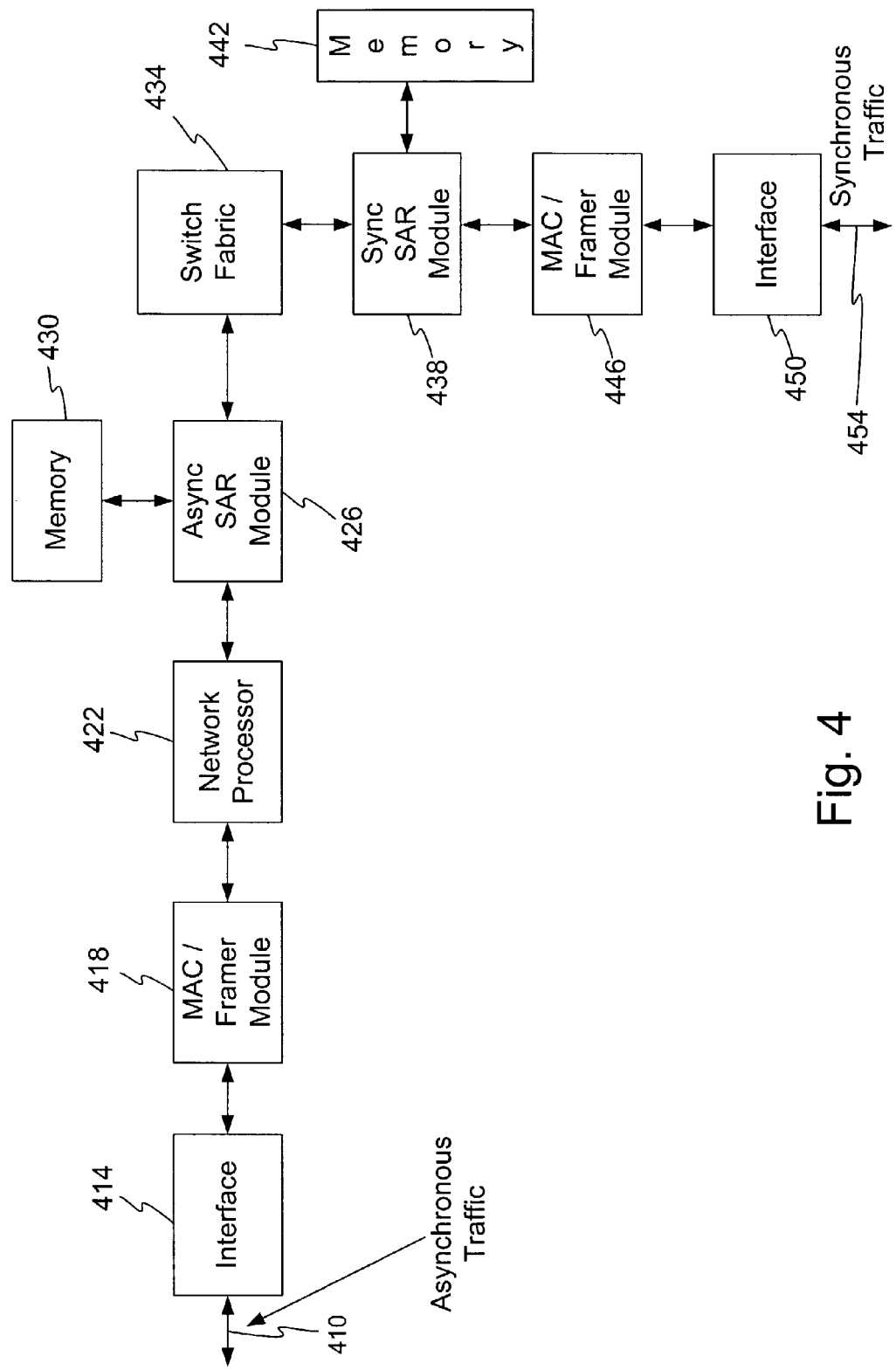
FIG. 4 illustrates a more detailed block diagram of an example embodiment of a switching interface as shown in FIG. 3.

FIG. 4 illustrates a block diagram of an example embodiment of a switching interface configured to connect an asynchronous network and a synchronous network. It should be noted that this is but one example embodiment and example environment of the invention. In addition, as understood by one of ordinary skill in the art, other components that are not shown would be included. Only those components helpful to an understanding of the invention are shown.

An asynchronous traffic input/output port 410 (I/O port) connects to an interface 414, which in turn connects to a MAC processor/framer module 418. The framer module 418 connects to a network processor 422, which in turn connects to an asynchronous segmentation and reassembly (SAR) processing module 426. The asynchronous SAR module 426 interfaces with a memory 430 and switch fabric 434. The term asynchronous SAR should be understood to mean a SAR configured to provide interface between asynchronous traffic and a synchronous switch fabric, or synchronous traffic and an asynchronous switch fabric.

Although shown as a single set of I/O processing hardware connected to a single port on the switch 434, it is contemplated that the switch may be enabled with any number of I/O ports. In one embodiment the switch includes 64 I/O ports. The switch 434 also connects to a synchronous SAR module 438. The synchronous SAR module 438 also interfaces with a memory 442 and a MAC/Framer module 446. The framer module 446 connects to an interface 450, which in turn connects to one or more channels 454 configured to carry synchronous traffic.

The interfaces 414, 450 are configured to achieve transmission of data, such as cells, frames, packet, or the like, over a physical medium. The interfaces 414, 450 may include all aspects necessary to connect to a transmission medium 410, 454. The interfaces 414, 450 may be configured in hardware, software, or a combination thereof. Interface operation is known by those of ordinary skill in the art and accordingly is not described in detail herein. In one example embodiment, the interfaces 414, 450 operate in accordance with the Physical Layer of the OSI model. As would be understood, there may be differences in the configuration of the interface 414 as compared to the interface 450 to account for the differences in accommodating synchronous traffic and asynchronous traffic.

The MAC/Framer modules 418, 446 comprise hardware, software, or a combination thereof configured to control access to a medium, such as the channel 410, 454 that may be shared by more than one device or entity. The MAC/Framer modules 418, 446 may also construct the frames, packets, or cell according to a communication protocol. MAC/Framer processing is known by those of ordinary skill in the art and accordingly is not described in detail herein.

The network processor 422 comprises a processor or configuration of logic and memory configured to perform header or tag analysis and processing on incoming frames, cells, or containers. In one embodiment the network processor 422 may provide routing decisions for attachment to a frame or for the switch fabric 434. One example of a network processor 422 is an Application Specific Network Processor (ASNP) available from Conexant Systems in Newport Beach, Calif. The network processor 422 may include a CAM or other memory device configured to store route or switch control information.

The asynchronous SAR 426 is a device configured to segment packets into cells and reassemble cells into packets. It may further be responsible for maintaining cell ordering, i.e. cell sequence. It is contemplated that the SAR 426 includes one or more memories and one or more pointers configured to track one or more locations in the one or more memories. In general, the SAR 426, 438 arranges the data into cells or frames of a size suitable for switching through the switch fabric 434. After passage through the switch fabric 434, the SAR 426, 438 reassembles the cells (frames) into a format for transmission over a medium. In one embodiment the SARs 426, 438 are similarly configured and the asynchronous network interface capability is selectively enabled. The SAR modules 426, 438 are described below in more detail with emphasis placed on the aspects of the SAR pertinent to the invention. The memory 430, 442 in communication with the SARs 426, 438 may comprise any type of memory including but not limited to RAM, SRAM, SDRAM, or DRAM or any other type of memory capable of rapidly storing data or retrieving data. In one embodiment high speed SARs 426, 438 utilize ZBT SRAM.

Figure 5:
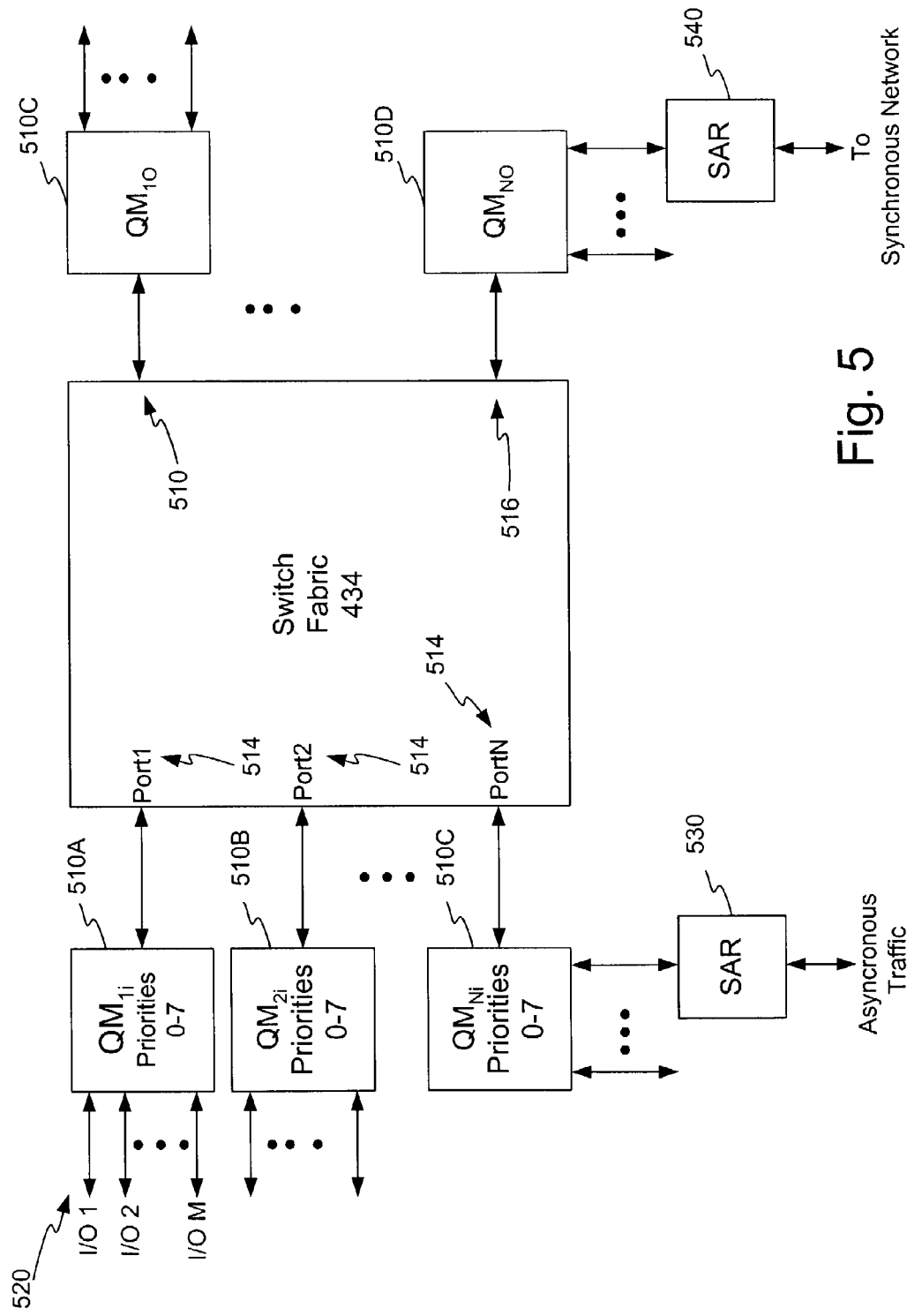
FIG. 5 illustrates a block diagram of the switch fabric shown in FIG. 4, including an exemplary connection to a segmentation and reassembly unit.

FIG. 5 illustrates a more detailed block diagram of a switch fabric with an exemplary connection to a segmentation and reassembly unit. It is contemplated that the switch fabric 434 may connect to one or more queue managers 510A-510D via ports 514. The queue managers 510 are designated $QM_{0-N}$ and there may exist a queue manager for each of the one or more input ports 514 and a separate queue manager for each of the one or more output ports 516. In one embodiment N=63 for a total of 64 input ports and 64 output ports. Hence the switch fabric may be referred to as a 64×64 crossbar switch. As a result, there exist 4096 total queues. Further, there may be different priorities associated with each queue thereby creating a plurality of sub-queues. In one embodiment there exist 8 priorities per queue. For example, each input port is configured with a queue for each output port or 64 input ports with 64 queues per each input port. Cells, arriving at each queue may be assigned a particular priority and hence be designated into a particular sub-queue corresponding to the priority. In another embodiment, the switch may be configured with 144 inputs and 144 outputs.

It is contemplated that the switch 434 may operates in accordance with the switch scheduling algorithm disclosed in co-pending patent application entitled Switch Scheduling Algorithm having inventors Yuanlong Wang and Libin Dong. This application is incorporated in its entirety by reference herein. The switch scheduling algorithm provides the advantage of reducing switch delay time, preventing or reducing blocking, and preventing or reducing starvation. As a result, the rate and consistency of cells or packets being provided to the SAR is improved. This in turn provides a more stable and hence predictable source of cells or packets.

It is contemplated that the queue managers 510 may include one or more memories, configured as queues, to store and assign priority to incoming and outgoing frames. In one embodiment each queue of the queue manager 510 comprises a first-in, first-out (FIFO) device. In the exemplary embodiment shown in FIG. 5, each queue manager 510 has 8 priority queues for each port. Other configurations may have other numbers of queues within each queue manager. Hence, for a 64 port switch, with 8 priorities per port, there exist 512 queues within each queue manager.

Connected to each queue manager 510 are one or more I/O channels 520 referenced by I/O 1 through M. Traffic may arrive through these channels for processing by the switch 434 to achieve desired routing. Connecting to one or more of the queue managers 510, such as 510C, is a SAR unit 530. A SAR unit 540 connects to queue manager 510D.

It is contemplated that the traffic arriving over SAR unit 530 may arrive in an asynchronous manner and that output via the SAR unit 540 may occur in a synchronous manner. Hence, bursty traffic may be arriving at irregular intervals at the SAR unit 530 and it may be desired to output this traffic onto a network operating and transmitting data in a synchronous manner. In addition, it may be desired to fully utilize the channel capacity of the synchronous network.

Figure 6:
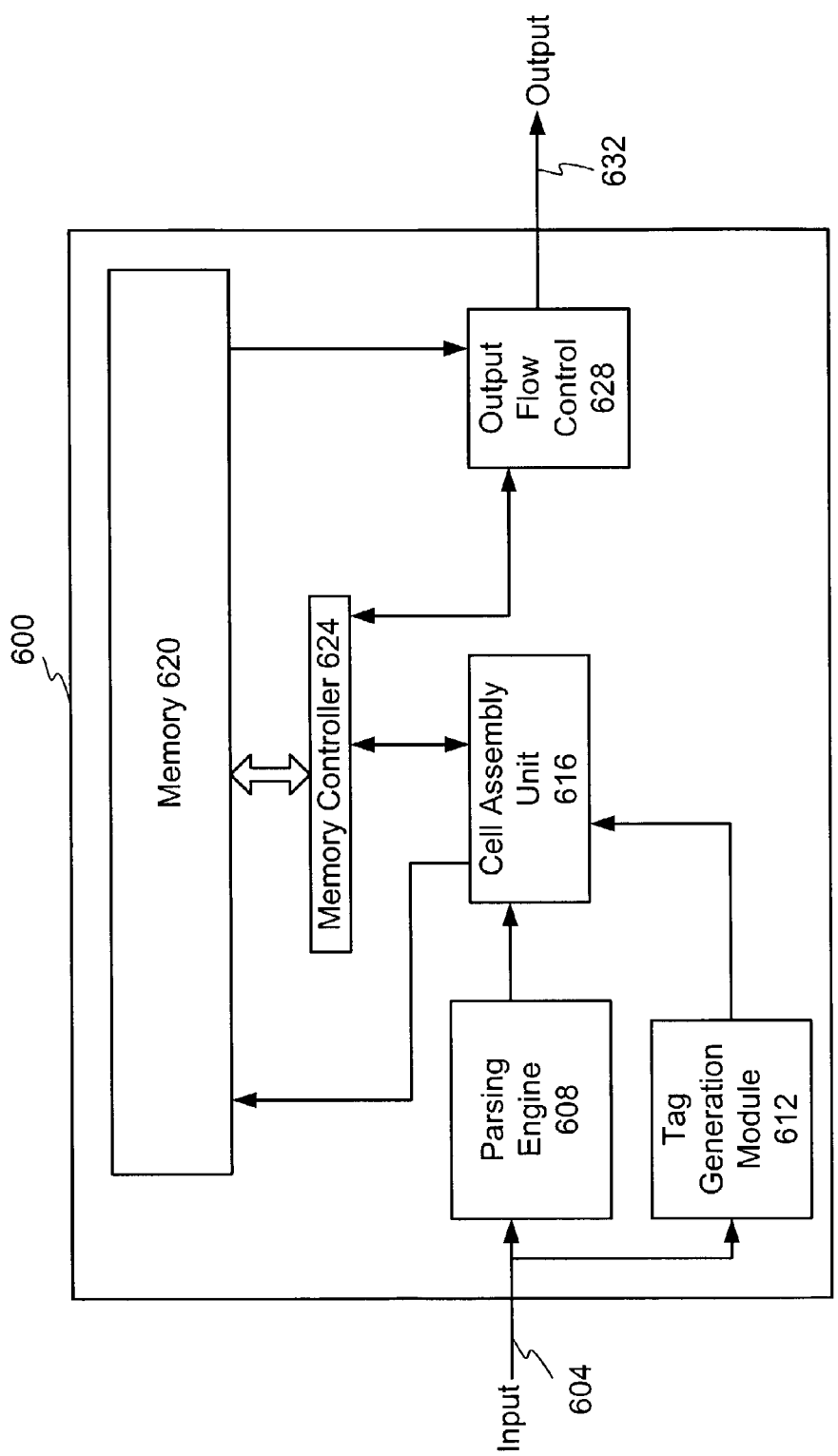
FIG. 6 illustrates a block diagram of an example embodiment of a segmentation and reassembly (SAR) unit configured in accordance with the method and apparatus shown and described herein.

FIG. 6 illustrates a block diagram of an example embodiment of a segmentation and reassembly (SAR) unit configured in accordance with the method and apparatus shown and described herein. In one embodiment the SAR unit 600 is configured to transmit asynchronously arriving data onto a synchronous network. Route selection may occur via a switch to achieve traffic transfer between the asynchronously arriving data and the synchronous network. In this example embodiment the segmentation and reassembly unit 600 (SAR unit) comprises an input 604 connected to a parsing engine 608 and a tag generation module 612. In one embodiment, the input 604 connects to a switch. It is contemplated that a SAR unit 600 may connect to one or more an individual ports of a switch, such as a crossbar switch, or to one or more ports of a queue manager, or to a network processor, such as a network processor receiving asynchronous traffic. Further, the SAR unit 600 may be duplicated numerous times to accommodate multi-port devices. Hence a SAR unit 600 may exist for each I/O port.

The parsing engine 608 comprises hardware, software, or a combination of both that is configured to separate incoming frames or packets into cells. The cell may be of any size. One example of a cell is an ATM cell which is 53 bytes in length. In another embodiment the cell comprises about 220 bytes in length. It is contemplated that cells serve as a uniform data block and thus may increase switching rate and facilitate switch synchronization. In contrast to packets, which may be of any length, cells should be considered to be of a consistent length.

The tag generation module 612 also receives the incoming data and may comprise hardware, software, or a combination of both that is configured to analyze frame or packet header information. Based on the analysis the tag generation module 612 creates a tag to be appended to each cell. Tag data may comprise any data able to assist in or speed switching, routing or processing of the cells. In one embodiment the tag comprises a source port identifier, a destination port identifier, and a priority identifier. The source port identifier comprises data regarding the source port of the switch, ADM, or switching interface from which the cell data arrived. The destination port identifier comprises data regarding the destination port of the switch, ADM, or switching interface through which the cell data will depart. The priority identifier comprises data that identifies the priority or importance of the cell data. This information may be utilized by the switch to facilitate switching or to guide queue or sub-queue assignment. Tag data may also be utilized to facilitate reassembly of the cells during output processing.

In another embodiment the incoming data to the network processor may be referred to as a datagram. Each incoming datagram arrives with a header or a signaling datapoint associated with it. These information fields may not be directly attached to the datagram, but may be obtainable. In such an embodiment the network processor logically associates this information to the datagram. Thereafter, it may look up any additional information that it may utilize to direct the datagram to its recipient or to an intermediate hop. Accordingly, the network processor may generate a tag that is prepended to the datagram so that subsequent entities receiving the datagram can deal with the datagram. For example, the tag associated with the datagram may contain destination address port, and the priority. It is contemplated that the tag may be generated from other types of information fields. It is further contemplated that the tag generation module may comprise any type lookup engine, which may be located within the network processor.

Figure 7:
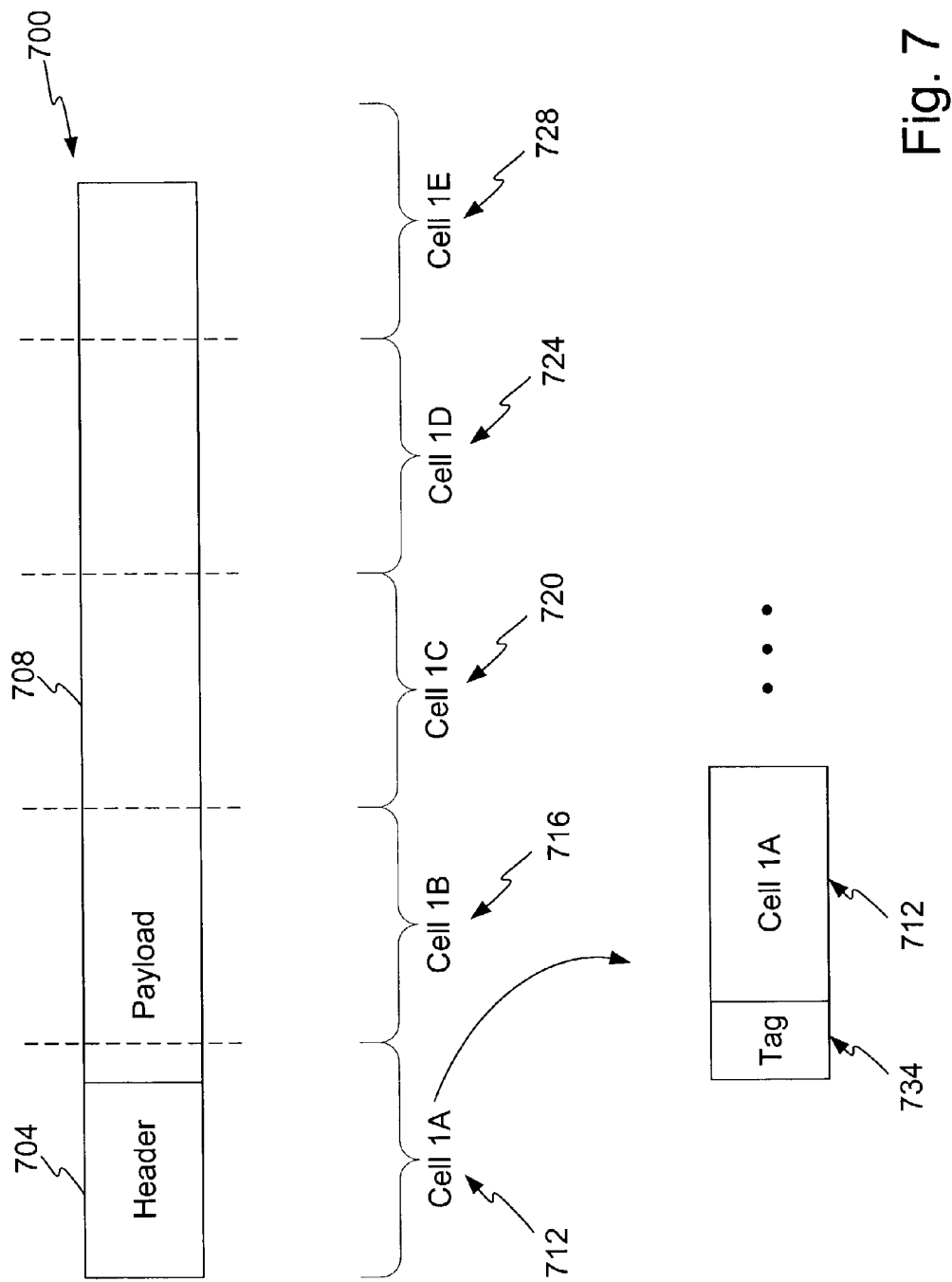
FIG. 7 illustrates an example flow diagram of a packet processing with the SAR.

Both of the parsing engine 608 and the tag generation module 612 connect to a cell assembly unit 616. The cell assembly unit 616 is configured to combine the cells received from the parsing engine 608 and the tags received from the tag generation module 612 into a single block of data. FIG. 7 illustrates an example flow diagram of a packet received by a parsing engine and assembly into cells with tags by the cell assembly unit 616. As shown, a packet 700 comprises a header 704 and payload 708. The parsing engine segments the packet 700 into cells 712-728. The tag generation module generates a tag 734 that is associated with the packet 700. In one embodiment all tags associated with a particular packet or frame are generally identical. In one embodiment tag information includes data regarding ordering of cells. The cell assembly unit appends a tag to cell, such as exemplary tag 734 with exemplary cell 712.

Returning now to FIG. 6, the cell assembly unit 616 connects to a memory 620 and a memory controller 624. The memory 620 may comprise any type of memory capable of storing and retrieving data, such as cells, at a high transfer rate. In one embodiment the memory 620 comprises SRAM. In other embodiments the memory 620 comprises SDRAM, DRAM, or any combination of memory. The memory controller 624 is configured to control ingress and egress of data, such as cells with appended tags (collectively cell), to the memory 620. It is contemplated that the memory controller 624 further includes an ingress pointer and an egress memory pointer. The ingress pointer designates a write location for a memory write operation. The egress pointer designates a read location for a memory read operation. Discussion of the ingress pointer, the egress pointer and their relationship is discussed below in more detail in conjunction with FIG. 8.

The memory 620 and the memory controller 624 also connect to an output flow control 628. The output flow control comprises hardware, software, or a combination of both configured to selectively output data from the memory 620 on to an output 632. In one embodiment, such as when the input 604 receives traffic from an asynchronous network, the output 632 connects to a switch. In another embodiment, when the input 604 receives traffic from a switch, the output 632 may connect to or provide traffic to a synchronous or asynchronous network.

For purposes of discussion, the SAR unit 600 shown in FIG. 6 illustrates only traffic flow in a single direction. It should be noted that one embodiment of a SAR unit 600 may be configured to perform both upstream processing and down stream processing. Hence, the SAR unit 600 may receive both input and output from a switch and input and output to a network, such as either a synchronous network or an asynchronous network. FIGS. 4 and 5 illustrate the general application of the SAR unit 600 in more detail.

FIG. 8 illustrates a memory having an ingress memory pointer and an egress memory pointer. As shown, the memory 800 is divided into a plurality of buckets 804, 808, 812, 816, 820. It is contemplated that in one embodiment a bucket exists for each source address (SA), such as each ingress port, and each priority (P). Thus, a bucket 804 exists for source address (SA) zero and priority (P) zero. In one embodiment zero is the highest of eight priorities. Similarly, bucket 816 is designated to contain cells directed to a source address of one and a priority of 0. Bucket 820 stores cells from source address one with a priority of one. It may be desirable to insert high priority traffic onto a synchronous network to achieve designated QoS levels. Although any number of priority levels may be stored in the memory 800, in one embodiment only traffic falling into the top or two top most priority levels will be channeled over a synchronous network. Lower priority traffic may not warrant or benefit from the predictable latency of a synchronous network. Traffic having lower priority, and hence not time sensitive may be switched over an asynchronous network when access or bandwidth is available.

Input to the memory occurs via input line 830 at a memory location for bucket 804 defined by ingress pointer 834. Output from the memory 800 occurs via output line 840 at a memory location for bucket 804 defined by egress pointer 844. Although not shown, it is contemplated that each bucket 804-820 may be serviced by separate ingress and egress pointers.

Hence, during operation the memory 800 is configured to receive cells generated from asynchronous traffic that is exiting a switch or other device and destine to be transmitted onto a synchronous network. Cells arrive from the switch via input line 830, and are placed in a bucket 804-820 that corresponds to a cell's source address and priority. As cells of source address zero and priority zero arrive at the memory they are placed into bucket 804 at a location defined by the ingress pointer. Each bucket may be maintained as a first-in, first-out (FIFO) structure. Buckets fill at various rates as defined by traffic patterns. It is contemplated that the cells input into the memory 800 may arrive at a sporadic rate, such as in a bursty fashion from an asynchronous network.

It is further desired to transmit cells from the memory 800. During an output opportunity, the memory controller outputs cells from transmit block 850, i.e. from the egress pointer 844 to the end of the bucket 804 or until an amount of bandwidth available during the transmit opportunity is utilized. This may occur during a transmit opportunity in a synchronous network. After a transmit operation the egress pointer 844 is advanced upward toward the ingress pointer 834. It is contemplated that cells continue to arrive at bucket 804 and are stored at a location defined by the ingress pointer 834. Separation 854 is maintained between the ingress pointer 834 and the egress pointer.

In one embodiment it is thus desired that the size of the transmit block 850 be adequate to fill the available capacity during a transmit opportunity. Hence, in the exemplary case of a SDH/SONET network, the transmit bucket 850 will be sized to be equivalent to a container. As a result, a full container will be transmitted from the memory 800 during a SDH/SONET transmit opportunity. This provides the advantage of fully utilizing bandwidth in the synchronous network.

As a further aspect of the method and apparatus described herein the distance or number of cells between the egress pointer 844 and the ingress pointer 834 is defined by a buffer block 854. The buffer block 854 contains or defines the number of cells or memory space between the egress pointer 844 and the ingress pointer 834. By selecting a size of the buffer block to be sufficient to size to fill, i.e. accommodate, one or more output operations to utilized the full capacity of a transmit opportunity.

Thus, in one embodiment output from the memory during transmit opportunities occurs such that the full bandwidth of a transmit opportunity is utilized. For example, by defining the transmit block 850 as $B_T$ and defining the buffer block 854 as $B_B$, the relation between the size of the transmit block and the buffer block may be defined such that the buffer size does not add an unwanted degree of latency and the buffer size prevents the read pointer (support) from crossing the write pointer (support) Hence, it is desired that the buffer should not sized to add only minimum latency and not so small as to allow overrun. In one embodiment this can be computed as the rate at which the read pointer moves, which may be a constant read rate, and the maximum delay the packet can incur while traversing the segmentation unit in the SAR on ingress, the switch fabric, and the reassembly unit in the SAR on egress before being declared complete. Stated another way, the higher a cell delay variation (CDV) through the switch fabric is, the higher is the variation in time a packet is completed. Furthermore, the buffer size may depend on the packet length distribution. The higher the CVD and the packet length distribution the deeper (larger) the buffer must be sized so that it may accommodate enough completed packets such that an underrun situation does preferably not occur during normal operation. As can be seen, the size of the buffer block is related to the rate of ingress into a bucket or the memory and the rate of egress resulting form transmit opportunities out of the memory and onto a synchronous network via output port 840. It is contemplated that output from the memory, during a transmit opportunity, may occur from a single bucket or from numerous buckets.

Figure 9A:
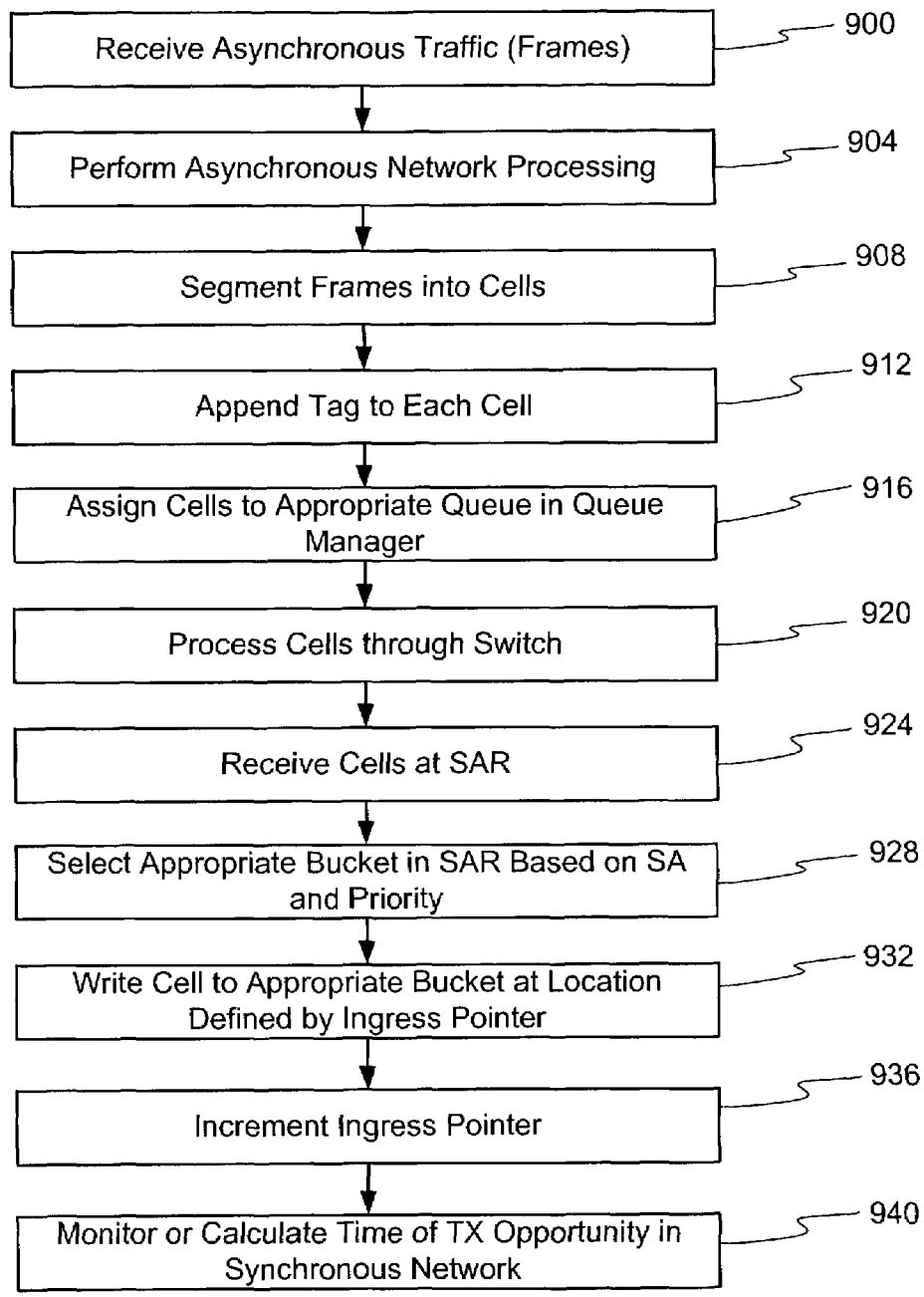
FIGS. 9A and 9B illustrate an example method of operation of an example embodiment of invention.
Figure 9B:
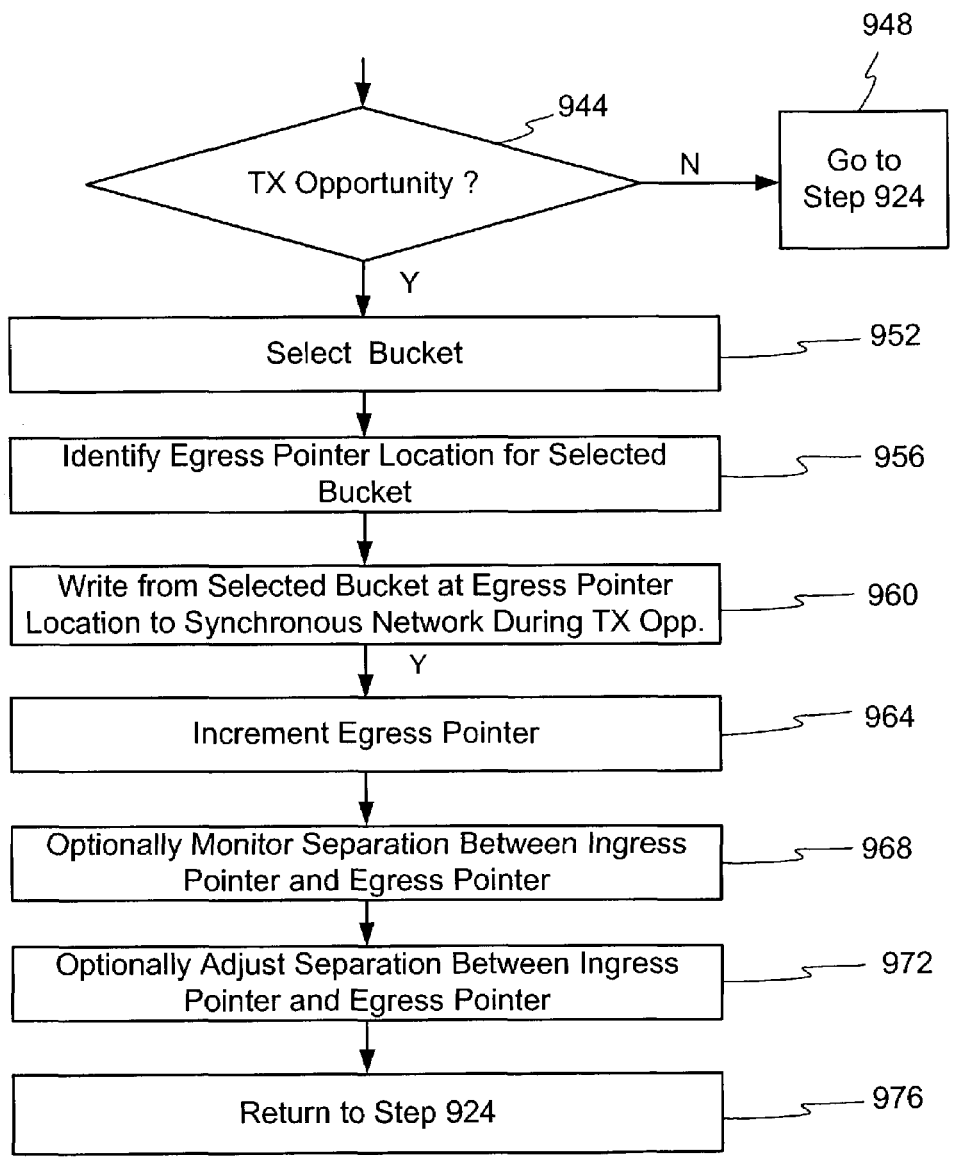

FIG. 9A and 9B illustrate an example method of operation of an example embodiment of the invention. This exemplary method is described for purposes of discussion and explanation and thus, the method and apparatus described herein is not limited to this particular method of operation. In general, a method is provided for receiving and assembly of asynchronous traffic for transmission over a synchronous network while utilizing, to the extent possible, the entire bandwidth allocated in the synchronous network.

In reference to FIG. 9A, at a step 900 traffic, such as frames or packets, is received over an asynchronous network. As is understood, asynchronous traffic is bursty and hence arrives at irregular intervals and in irregular quantities over time. This can provide difficulties when attempting to assemble the asynchronous traffic to transmission onto a synchronous network. Further, some switch systems suffer from head of line blocking and port starvation and, as a result, consistent traffic flows can not be guaranteed. In one embodiment the method and apparatus described herein is contemplated for use with M21154 Crosspoint Switch available from Mindspeed Technologies located in Newport Beach, Calif.

Next, at a step 904, a network processing apparatus performs network processing on the incoming frames. In one embodiment processing associated with an asynchronous network is performed. At a step 908 a processing module, such as a segmentation and reassembly unit, segments the frames into one or more cells. At a step 912 the operation appends a tag to each cell.

At a step 916 the cells are assigned to an appropriate queue and sub-queue as may be controlled by a queue manager. The queue(s) may momentarily buffer the cells based on source address (SA), destination address (DA), and the priority associated with the cell data. Thereafter at a step 920, the cells are processed through a switch or other interconnection device capable of selectively matching traffic from one or more input ports to one or more output ports. It is contemplated that for purposes of discussion the cells are to be transmitted over a synchronous network and hence are output from the switch via an output port connected to a synchronous network.

After progressing through the switch, the cells are received at a SAR unit. This occurs at a step 924. Upon receipt, the cell is analyzed and, based on the analysis, a bucket is selected that corresponds to the cell. A cell's tag, such as the source address and priority, may be analyzed as part of this process. Accordingly, at a step 932, the cell is written to the selected bucket in a memory at a location defined by an ingress pointer associated with the selected bucket. Each bucket in the memory may have an ingress pointer and an egress pointer associated wherewith. After writing the cell to the selected bucket at the ingress pointer location, the system updates the ingress pointer at a step 936. For example, a bucket's ingress pointer may be incremented to a new bucket (memory) location each time a cell is written to that bucket.

Next, at a step 940, the method monitors for or calculates the time at which a transmit (TX) opportunity will occur in the synchronous network. This step may occur intermittently or be a continual and ongoing aspect of the operation described in FIG. 9. In one embodiment the asynchronous traffic described above may be entitled to one or more transmit opportunities of a synchronous network's total number of transmit opportunities. In the case of a SDH/SONET network there exist one transmit opportunities per container. Data received from the asynchronous network discussed above may be allocated the bandwidth of one or more of these transmit opportunities.

Turn to FIG. 9B, a decision step 944 determines if a transmit opportunity is beginning or available. A transmit opportunity may be considered to have transmit duration defined by a start time and a stop time. Only during the start time and the stop time is it permissible to read data from and write data to the synchronous network. At a start time it is determined if data is available for transmission. In one embodiment data must be available at the start time for a transmit operation, i.e. container fill operation, to be initiated. If data is not available, then the container will be sent empty which will effectively reduce the payload data rate. Hence, it may be desired to have data awaiting transmission over the synchronous network at the start time of the transmit duration. If at decision step 944, a transmit opportunity is not available, the operation advances to step 948 and the operation returns to step 924 to continue the process of accepting cells and placing these cells in an appropriate bucket. In one embodiment the transmit opportunity is given if the container is marked empty.

Alternatively, if at step 944 it is determined that a transmit opportunity is available then the operation advances to a step 952. At a step 952, one or more buckets are selected from which to transmit during the transmit opportunity. Thereafter, the system identifies an egress pointer for each selected bucket. This occurs at a step 956. The egress pointer defines the location in each bucket from which cells will be retrieved and transmitted onto the synchronous network during the transmit opportunity.

At a step 960, the operation writes from the selected bucket(s) from locations defined by egress pointers, to the synchronous network. Cells may be drawn from more than one bucket to fill the available bandwidth of the transmit opportunity. As it is desired to utilize the full bandwidth offered by the transmit opportunity it is contemplated that an adequate number of cells be stored in the buckets and pre-identified by the egress pointer upon occurrence of a transmit opportunity. As a result, during the limited time of the transmit opportunity the cells are rapidly sent over the synchronous network without need to wait for additional cell output from a switch or other device. In short, there may not be sufficient time during the transmit opportunity to await output from the switch. If sufficient cells were not available at the bucket memory the full bandwidth of the transmit opportunity may occur due to the bursty nature of the asynchronous traffic and arrival of cell from the switch at irregular patterns.

At a step 964, the system increments the egress pointer. It is contemplated that in one embodiment there are sufficient additional cells in the buckets such that incrementing the egress pointer(s) results in a sufficient number of additional cells be designated as available during a subsequent transmit opportunity to utilized the bandwidth of the transmit opportunity. Hence, even if due to irregular traffic through the switch only a few additional cells are placed into the buckets between transmit opportunities, the buckets contain a sufficient number of cells to full the bandwidth capacity of one or more additional transmit opportunities.

At a step 968 the operation may optionally monitor the separation between, i.e. number of cells between, the ingress pointer and the egress pointer. Based on the monitoring, the operation may advance to step 972 and optionally adjust the separation between the ingress and egress pointer. By optionally adjusting this separation, bandwidth usage may be improved.

At a step 976 the operation returns to step 924. As an advantage over the prior art, bursty traffic arriving through the switch is buffered so that maximum bandwidth usage occurs during a transmit opportunity. In this manner the irregular arrival rate of asynchronous traffic is accounted for and maximum bandwidth usage of a transmit opportunity may occur. In one embodiment a low variation in the switch throughput is desired. As discussed above, low variation in switch throughput may be achieved by reducing blocking or starvation in the switch. This results in a more regular and predictable flow to the buckets.

While various embodiments of the invention have been described, it will be apparent to those of ordinary skill in the art that many more embodiments and implementations are possible that are within the scope of this invention.

What is claimed is:

1. A method for providing asynchronous traffic to a synchronous network comprising:
   receiving a cell from an asynchronous network, the cell having a header and a payload;
   analyzing the header to classify the cell;
   storing the cell at the memory location defined by an ingress pointer based on the analyzing to create stored cells;
   updating the ingress pointer; and
   responsive to a transmit opportunity in the synchronous network:
      reading the stored cells from the memory at a location defined by an egress pointer;
      transmitting the stored cells onto the synchronous network; and
      updating the egress pointer, wherein the ingress pointer and the egress pointer are maintained such that during a transmit opportunity stored cells are transmitted onto the synchronous network wherein receiving a cell comprises:
         receiving frames via an asynchronous network;
         segmenting the frames into one or more cells;
         associating a header with each of the one or more cells; and
         switching the one or more cells and associated header through a switch fabric.

2. The method of claim 1, wherein a transmit opportunity comprises an opportunity to allow a first number of cells to be transmitted onto the synchronous network and the switching occurs at a rate which allows a first number of cells to be memory.

3. The method of claim 1, wherein the stored cells comprise a container of cells.

4. The method of claim 1, wherein the ingress pointer and the egress pointer are maintained such that during a transmit opportunity no less than a container of cells remains in the memory.

* * * * *